3,247,040
CORRUGATED PAPERBOARD
Jerome Fine, Oceanside, and Charles A. Kumins, Chappaqua, N.Y., and Vernon L. Chase, Butler, N.J., assignors to Interchemical Corporation, New York, N.Y., a corporation of Ohio
No Drawing. Filed Dec. 21, 1961, Ser. No. 161,264
3 Claims. (Cl. 156—210)

This invention relates to corrugated paperboard. More particularly, the invention relates to an improved method of making corrugated paperboard and to the improved paperboard produced by said method.

Corrugated paperboard is conventionally made by a multi-step operation wherein a strip of paper core material is corrugated by means of heated fluted rolls, adhesive is applied to the tips of flutes on one side of the corrugated paper core material, a paper liner is then adhered to the flute tips by bringing the liner into contact with the wet adhesive and drying to set the adhesive. This gives a "single faced" corrugated board consisting of a corrugated strip of paper bonded to a smooth surfaced "liner" sheet. In the manufacture of "double faced" corrugated paperboard, additional adhesive is applied to the flute tips of the exposed corrugated surface of the single faced board and a second smooth liner sheet is adhered to the corrugated liner by heat and pressure. The double faced corrugated board consists of a strip of corrugated paper core laminated to two smooth surfaced liner sheets.

Aqueous solutions of starch or sodium silicate are the most common adhesives used in the manufacture of corrugated paperboard. Both of these adhesives contain large quantities of water that must be removed before the adhesive bond is developed. This heating to dry and set the adhesive is carried out at relatively high temperatures in the order of 250° F. to 350° F. and produces several objectionable results. One of the most objectionable of these results is the development of "warp" in the corrugated paperboard. This warping of the board is across the sheet, i.e., at right angles to the direction of travel through the corrugator. Warping is believed to develop because the present change in fiber diameter is greater than the change in length of the paper fibers and since the fibers generally lie in the direction of travel through the corrugator, the resultant change is greatest across the sheet.

The present invention provides a process for making corrugated paperboard which substantially overcomes the warping problem. The process of the invention consists in using foamed polyvinyl acetate latex as the adhesive for bonding the corrugated liner to the smooth liner sheets and using less heat to dry and set the adhesive. Use of the foamed adhesive permits adequate bonding of the liner to the corrugated core without using large amounts of water and, surprisingly, a stronger bond is formed with less adhesive solids than is obtained with unfoamed polyvinyl acetate adhesives or with starch or sodium silicate adhesives. The process makes the use of the more expensive polyvinyl acetate adhesives economically competitive with the less expensive conventionally used starch and sodium silicate adhesives. Also, because of the less heating required, this process makes it possible to operate the corrugator at a much faster speed and this results in increased production of the finished corrugated paperboard.

The foamed polyvinyl acetate is preferably prepared from an aqueous emulsion of polyvinyl acetate. The foaming is most conveniently accomplished by emulsifying air or other inert gases in the polyvinyl acetate emulsion. Any conventional whipping device may be used for this purpose e.g., a 140 quart Hobart mixer using a wire whip or a mixer not unlike an ordinary kitchen mixer or "egg beater." Other methods of foaming the polyvinyl acetate include the impregnation of air or other inert gases under pressure into the polyvinyl acetate emulsion or the use of blowing agents in the composition.

Where foaming is accomplished by the incorporation of air or other inert gases into the emulsion of polyvinyl acetate, it is preferable that the resulting foam have a density below 0.75 gm./cc. and most preferably from 0.25 to 0.5 gm./cc. Prior to foaming the adhesive composition may have a density of at least 1 gm./cc.

The polyvinyl acetate emulsions prior to foaming are conventional polyvinyl acetate adhesive compositions. The compositions may contain conventional thickeners, solvent additives, fillers and plasticizers. Utilizable thickeners include partially acetylated polyvinyl alcohol such as "Elvanol" alcohols, methyl cellulose, hydroxyethyl cellulose, carboxymethyl cellulose and gum tragacanth. Utilizable solvent additives are preferably water immiscible solvents, including carbon tetrachloride, trichlorethylene, toluene, benzene and ethyl acetate. Suitable fillers include clay and calcium carbonate and calcium sulfate. Suitable plasticizers include chlorinated biphenyl such as Aroclor 1254, dipropylene glycol dibenzoate, polyethylene, toluene, benzene and ethyl acetate. Suitable fillers butyrate) and -(2-ethylhexoate), dibutoxyethyl phthalate, butyl phthalyl butyl glycolate, methyl phthalyl ethyl glycolate, triacetin, triphenyl and tricresyl phosphates.

With foamed adhesive compositions containing incorporated air e.g., aforementioned emulsion of air in adhesive compositions, the foamed composition may be conveniently kept in a reservoir from which it is applied to the tips of the flutes, e.g., by extrusion or by gravity flow.

The process of this invention may be practiced using conventional corrugated paper producing apparatus. In using such apparatus it is preferable that the tips of the flutes of the corrugated core be at a temperature below 200° F. when the foamed adhesive is applied thereto. Therefore, in apparatus where the flutes are formed by heating, it is preferable that the foamed adhesive be applied at a point in the process where the flute tips have cooled to below said temperature.

A smooth outer liner is then applied to the flute tips of the corrugated sheet and the adhesive is permitted to set, preferably by heating to a temperature below 250° F. and most preferably 200° F. or lower. The resulting sheet is a "single faced" sheet.

"Double faced" sheets may be made in a similar conventional manner, e.g., after the first outer liner is applied and before heating to set the adhesive, foamed adhesive is applied to the flute tips of the exposed corrugated surface and a second smooth liner is applied to said tips after which, the adhesive in the structure is permitted to set preferably by heating in the above described ranges.

Alternatively, "double faced" sheets may be prepared using foamed adhesives only to attach the second smooth liner. In such a case, the first smooth liner may be attached to the corrugated sheet using conventional adhesives in the conventional manner.

It should be noted that in the specification and claims of this application, all proportions are by weight unless otherwise stated.

In the following examples, typical polyvinyl acetate adhesive compositions which may be foamed in accordance with this invention are given:

*Example 1*

A solution of Elvanol 52–22 (a polyvinyl acetate-alcohol which is 88% hydrolyzed) is prepared by heating under agitation a mixture of 8.42 lbs. of Elvanol 52–22, .04 lb. of methyl parahydroxybenzoate and 9.08 gallons of water to 195° F. for about 15 minutes.

2.23 gallons of the resulting solution are added together with 0.79 gallon of water to a slurry of 8.46 lbs. of clay (aluminum silicate particles having an average size of 0.8 micron) in 0.39 gallon of water. The mixture is stirred until smooth. Then, 5.1 gallons of aqueous polyvinyl acetate emulsion (55% solids) are added and the mixture is stirred for 10 minutes. 0.5 gallon of dipropylene glycol dibenzoate and 0.35 gallon of carbon tetrachloride are added and the mixture is stirred for 10 minutes.

*Example 2*

A solution of Elvanol 52–22 (a polyvinyl acetate-alcohol resin which is 88% hydrolyzed) in water is prepared by heating under agitation a mixture of 8.42 lbs. of Elvanol 52–22, .04 lb. of methyl parahydroxybenzoate and 9.08 gallons of water to 195° F. for about 15 minutes.

10 lbs. of the resulting solution are added together with 6 lbs. of water to a slurry of 11 lbs. of clay (aluminum silicate) particles having an average size of 0.8 micron in 5 lbs. of water. The mixture is stirred until smooth. Then 48 lbs. of aqueous polyvinyl acetate emulsion (55% solids), 6.5 lbs. of trichlorethylene, 8.5 lbs. of Aroclor 1254 (chlorinated biphenyl plasticizer) and 5 lbs. of water are added with mixing.

The formulations set forth in Examples 1 and 2 were whipped in air using a Hobart 140 quart mixer with a wire whip to emulsify air into the composition to form foamed compositions having specific gravities of from .25 to .75 gm./cc.

What is claimed is:

1. In the process of continuously forming corrugated paperboard comprised of a corrugated core material laminated to at least one paper liner by means of an adhesive, the improvement which consists in applying a foamed polyvinyl acetate latex adhesive to only the flute tips of the corrugated core material and adhering the paper liner to the corrugated core material by heating to a temperature of 200° F. as a maximum.

2. In the process of continuously forming corrugated paperboard comprised of a corrugated core material laminated between two paper liners by means of an adhesive, the improvement which consists in applying a foamed polyvinyl acetate latex adhesive to only the flute tips of at least one side of the corrugated core material and adhering the paper liner to the corrugated core material by heating to a temperature of 200° F. as a maximum.

3. In the process of continuously forming corrugated paperboard comprised of a corrugated core material laminated between two paper liners, wherein the two paper liners are adhered to the core material at two different steps of the process, the improvement which consists in adhering the secondly adhered liner by applying a foamed polyvinyl acetate latex adhesive to only the flute tips to which the secondly adhered liner is to be applied and adhering said liner by heating to a temperature of 200° F. as a maximum.

References Cited by the Examiner

UNITED STATES PATENTS

| | | | |
|---|---|---|---|
| 1,186,997 | 6/1916 | Langston | 156—473 |
| 2,459,955 | 1/1949 | Morrison et al. | |
| 2,973,295 | 2/1961 | Rodgers | 156—79 |
| 2,983,636 | 5/1961 | Runton | 156—210 |
| 3,034,942 | 5/1962 | Heiks | 156—292 |

EARL M. BERGERT, *Primary Examiner.*